US012218457B1

(12) United States Patent
Neumaier et al.

(10) Patent No.: US 12,218,457 B1
(45) Date of Patent: Feb. 4, 2025

(54) CONTACTLESS HIGH POWER RF CONNECTOR

(71) Applicant: SPINNER GmbH, Munich (DE)

(72) Inventors: Christoph Neumaier, Baiern (DE); Herbert Hammerschmidt, Kolbermoor (DE); Josef Landinger, Aschau (DE)

(73) Assignee: SPINNER GmbH, Munich (DE)

( * ) Notice: Subject to any disclaimer, the term of this patent is extended or adjusted under 35 U.S.C. 154(b) by 0 days.

(21) Appl. No.: 18/899,636

(22) Filed: Sep. 27, 2024

Related U.S. Application Data

(63) Continuation of application No. PCT/EP2022/079599, filed on Oct. 24, 2022.

(51) Int. Cl.
*H01P 5/04* (2006.01)
*H01P 1/12* (2006.01)
*H01P 5/18* (2006.01)
*H01R 13/52* (2006.01)

(52) U.S. Cl.
CPC ............ *H01R 13/52* (2013.01); *H01P 1/127* (2013.01); *H01P 5/04* (2013.01); *H01P 5/184* (2013.01); *H01P 5/187* (2013.01)

(58) Field of Classification Search
CPC .. H01P 5/187; H01P 5/184; H01P 5/18; H01P 5/16; H01P 5/12; H01P 5/04; H01P 5/00; H01P 1/10; H01P 1/12; H01P 1/127
See application file for complete search history.

(56) References Cited

U.S. PATENT DOCUMENTS 3,121,848 A 2/1964 Kruse, Jr. et al.
3,166,723 A * 1/1965 Bock ......................... H01P 5/04 333/111
3,747,027 A * 7/1973 Bolt ......................... H01P 1/127 333/116
4,754,241 A 6/1988 Spinner

FOREIGN PATENT DOCUMENTS

EP 3300535 B1 11/2019
EP 4109667 A1 12/2022
EP 4109670 A1 12/2022

OTHER PUBLICATIONS

Bolt, M. et al., Directional Coupler Switch, IBM Technical Disclosure Bulletin, 1972, 15(6):1914.

(Continued)

*Primary Examiner* — Stephen E. Jones
(74) *Attorney, Agent, or Firm* — Quarles & Brady LLP; Yakov S. Sidorin

(57) ABSTRACT

A RF connector includes a first conductor and a symmetrical second conductor. Each conductor has an elongated structure of a flat conductive material with a length corresponding to ¼ of a nominal frequency of a signal to be coupled and is connected at a first end to a coaxial connector and at a second end to the housing. The RF connector can be switched between an ON state and an OFF state. In the OFF state, the first conductor is distant from the second conductor and in the ON state the first conductor is in close contact with the second conductor such that open sides of their respective housings are oriented against each other, and the conductors are facing each other.

17 Claims, 9 Drawing Sheets

(56) References Cited

OTHER PUBLICATIONS

European Patent Office, Extended Search Report, Application No. 21180753.2, Nov. 24, 2021, 8 pages.
European Patent Office, Extended Search Report, Application No. 22166617.5, Sep. 7, 2022, 7 pages.
PCT International Search Report and Written Opinion, PCT/EP2022/066717, Sep. 15, 2022, 11 pages.
PCT International Search Report and Written Opinion, PCT/EP2022/079599, Jan. 25, 2023, 13 pages.

* cited by examiner

CONTACTLESS HIGH POWER RF CONNECTOR

CROSS-REFERENCE TO RELATED APPLICATIONS

This application is a continuation of the pending International Application No. PCT/EP2022/079599 filed on Oct. 24, 2022 and now published as WO2023/193939, which designates the United States and claims priority from the European Application No. 22166617.5 filed on Apr. 5, 2022. The disclosure of each of the above-identified patent documents is incorporated herein by reference.

FIELD OF THE INVENTION

The invention relates to a coaxial RF connector system which can be connected or disconnected under load.

DESCRIPTION OF THE RELATED ART

A coaxial RF connector system is disclosed in EP 3 300 535 A1. This connector system can couple comparatively high RF power up to a few kilowatts. For connecting and/or disconnecting, the power must be switched off. If these connectors are connected or disconnected under load, arcing may occur which may lead to a severe damage of the connectors. Further, there are no precautions to avoid an early connection between the center conductors during connecting or a late disconnection of the center conductors while disconnecting, specifically due to arcing. A center connector contact without shield or ground contact may incur a safety risk, as an ungrounded section of the conductor system may be at a high voltage. This may be harmful for person operating the connectors.

A 3 dB directional coupler is disclosed in U.S. Pat. No. 4,754,241 A. It includes two sets of strip lines which are arranged parallel, close to each other with a small gap between the strip lines.

SUMMARY OF THE INVENTION

The problem to be solved by the invention is to provide an RF connector system which is able to transfer high RF power in the range of multiple kilowatts and which can be safely connected and/or disconnected when RF voltage is applied to at least one side of the connector system.

Solutions of the problem are described in the independent claims. The dependent claims relate to further improvements of the invention.

A connector system according to an embodiment is based on a pair of contactless couplers. The coupler structure is similar to a 3 dB coupler which has only one input and one output, thus acting as a zero dB coupler. The coupler may be based on strip line technology and may have a strip line having a length of λ¼, which is ¼ of the wavelength of the signal to be coupled. It may also have multiple of ¼ of the wavelength. In a connected state two strip lines are close to each other. In a disconnected state, the strip lines may be distant from each other such that there is no more any coupling between the strip lines. There may be a guiding mechanism such that the connecting and disconnecting process is made by a linear movement of shifting or displacing the two sets against each other. The strip lines may be bent or folded at least one time or multiple times to reduce the size of the couplers.

In an embodiment, an RF-connector includes two almost symmetrical and/or identical coupler sections. Each coupler section may include a conductor. A housing holding the conductors may have basically a cuboid shape which may have an open side and which may form an open cavity having a shape of an elongated channel for the conductor. The shape of the housing may be comparatively flat. Typical dimensions may be a length and a width in a range of between 20 mm and 300 mm. The height of the housing may be between 3 mm and 50 mm. The dimensions of the housing are determined by the conductor inside the housing, which may have a length corresponding to ¼ of the nominal frequency of a signal to be coupled. Each conductor has an elongated structure of a flat conductive material. It may include a strip of copper or brass or even aluminum which may further be coated with a conductive material, e.g., silver or gold on its outer surface. A conductor may have a width in a range of between 1/100 to 1/5 of its length and may have a thickness in a range of between 0.5 mm and 5 mm. The conductor may be wider than its thickness. The conductor may be arranged in the open cavity of the housing and recessed against the outer surface of the housing. Therefore, the conductor may not protrude from the surface of the housing. The conductor may be connected with a first end to a coaxial connector to provide electrical contact. Instead of a connector, a further strip line or any kind of waveguide may be provided. On its second end opposing to the first end, the conductor may be connected to the housing. It may specifically be connected to a sidewall of the housing.

The RF-connector basically is intended to have the function of a switch, and therefore may also be considered as a switching coupler. It may be switched between an ON-state and an OFF state. In the OFF state, a first conductor is distant from a second conductor. Distant means that the conductors of two opposing conductors do not overlap, but edges of the housings may touch. To achieve a higher isolation, the conductors may be distant from each other without touching each other.

In the ON-state, the first conductor is in close contact and/or close proximity with the second conductor.

In an embodiment with separate housings for each conductor, the open sides of the housings may be oriented against each other and may be overlapping. This may form a common cavity between the two housings with the conductors facing each other, preferably over their full length and/or width.

Normally, the conductors would not touch each other. They may for example, be recessed against the surface of the housing. These close facing conductors provide a non-galvanic coupling for RF-signals in the ON-state. In contrast thereto, in the OFF state, each conductor is a λ/4 transformer providing a virtual open circuit at its coaxial connector.

In an embodiment, the conductors may be arranged in separate planes, such that the planes are parallel in an ON-state. The conductors may be mirror-symmetrical about a symmetry plane between the planes of the conductors. The symmetry plane may be parallel to the planes of the conductors.

In an embodiment, the conductors have a curved shape. Such a curved shape may include angles, bends and edges.

In an embodiment, in an ON state, the conductors may be separated by an essentially constant distance. So, the conductors may never touch and maintain a galvanic insulation between them. The conductors may have slightly varying distances due to manufacturing tolerances or due to minor bending for optimizing coupling characteristics.

In an embodiment, in an ON state, the conductors may be separated by a distance smaller than 1/10 of a nominal wavelength of a signal to be coupled.

To perform a proper switching function, further a mechanical support structure may be provided which guides the movement of the conductors between the ON- and OFF state. This may be a linear guide system, which may include linear rails or similar guiding structures. Further, the mechanical support structure may provide means to hold the conductor in either ON- and/or OFF state.

In an embodiment, each coupler section may be contained in a housing. Each housing may hold a conductor. Further each housing may have a cuboid shape with an open side forming an open channel, such that each conductor may be located in an open channel. In the ON state the open sides of the housings are oriented against each other.

In another embodiment, both coupler sections and therefore, both conductors are contained in a common housing holding both conductors. Here, at least one of the conductors is movable within the housing relative to the other conductor. The housing may be closed completely with only two coaxial connectors for connecting the conductors. In another embodiment, the housing may have one or two open sides, such that it may have a shape of a rectangular waveguide.

The first conductor may be relatively movable against the second conductor. Here, the mechanical support structure may include at least one groove, guide rail or (linear) bearing for guiding the first conductor. There may further be provided an actuator for movement of the first conductor.

Further, a short circuit element may be provided at an off-position of at least one of the conductors. The off position is a position where the conductor is in an OFF state. The short circuit element may be configured to provide capacitive coupling between at least one conductor and the at least one housing. There may be multiple short circuit elements which may be arranged close to multiple sections of a conductor (e.g., in a U-shaped conductor or even more complex conductor). At least one further short circuit element may be arranged in parallel to at least one further straight section of a conductor, such that is in close proximity to the straight section in an OFF position. Any of the short circuit elements may have a dielectric surface coating, which may include an oxide layer, a powder coating, a painted coating or a plastic material.

In another embodiment, a short circuit contact may be provided which provides a galvanic contact between the conductor and ground in the OFF position. This contact may be spring loaded. It may be configured such that it is in contact with the conductor only in the final OFF position and not during movement between the conductors. This allows the switching process without involving a galvanic contact, while the galvanic contact is only a safety feature.

In an embodiment, the conductors are arranged slidable sidewards against each other on a plane of at least one of the open sides. Both open sides may be on the same plane. This provides a well-defined transition between the ON- and OFF states. Basically, the conductors may be movable in any direction as long as the conductors are in close proximity in an ON state and distant in an OFF state. Alternatively, the conductors may be rotated relatively against each other. The ON position may be, when they overlap in the same orientation and the OFF position may be at an angle e.g., at 90 or 180 degrees.

In another embodiment, each conductor has a U-shape. Such a U-shape may include a first straight section and a second straight section parallel to the first straight section. The straight sections may be interconnected by a traverse section. The U-shape is beneficial, as it reduces the overall length of the coupler. The U-shape basically is a twofold bent coupler. In further embodiments, the coupler may have an unbent linear structure, or it may have multiple bends, like three or four or more bends. A higher number of bends further reduces the size which may be beneficial for lower frequencies.

In an embodiment, the conductors are arranged slidable perpendicular to the straight sections. Such a perpendicular movement provides a very smooth transition without having electrical field peaks which may lead to arching during switching of high power levels.

In an embodiment, a sealing strip and/or a gasket may be provided at an open side of the housing or at least one coupler section, or at both coupler sections to improve the electrical contact between the coupler sections.

In an embodiment, at least one matching plate or a matching structure may be provided between a housing and a conductor of a coupler section. Such a matching plate may be adjustable in its distance to the conductor. It may either include a dielectric material or a conductive material which is electrically connected to the housing. Such a matching plate may be used to adjust the impedance of the conductor and/or the frequency response thereof.

In an embodiment, at least one tuning rod is provided, which may be configured to bend at least one of the conductors to modify the distance between the conductors. This may help to optimize the structure and compensate for manufacturing tolerances. The at least one tuning rod may include a dielectric material. It may further include an outer thread which matches into a threaded hole of a housing.

DESCRIPTION OF THE DRAWINGS

In the following the invention will be described by way of example, without limitation of the general inventive concept, on examples of embodiment with reference to the drawings.

DETAILED DESCRIPTION

FIGS. 1 to 7 relate to a first embodiment.

Figure 1:
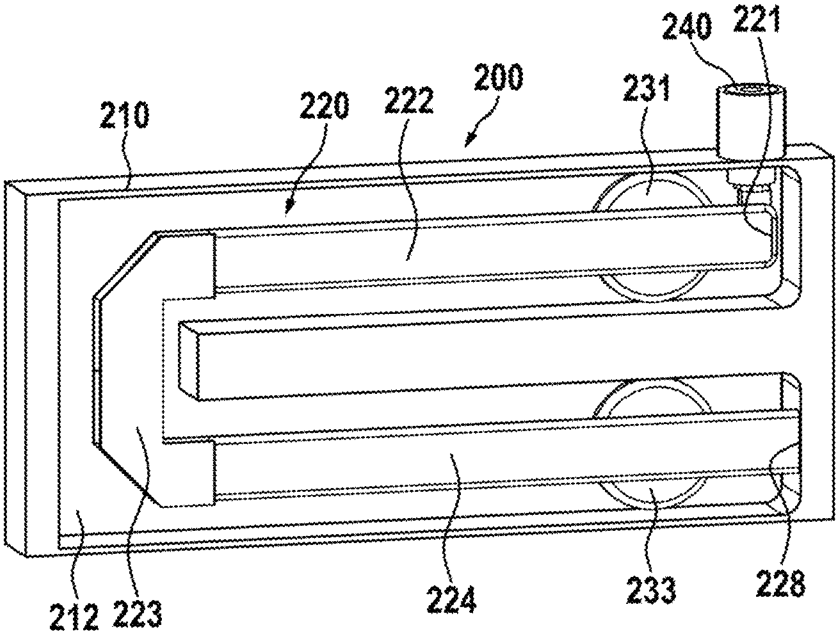
FIG. 1 shows a coupler section of a first embodiment.

In FIG. 1, a coupler section 200 is shown. In a full connector, two preferably identical sections are arranged symmetrically. Here, a first coupler section 200 is described in detail. The coupler section 200 includes a housing 210 holding a conductor 220. The conductor is in an open cavity 212 slightly recessed below the surface of the housing 210, such that it does not protrude outside of the housing. The housing may be of solid metal or any other suitable conductive material, forming the cavity 212 for the conductor. In the embodiment shown in this Figure, the cavity 212 has a U-shape for holding a U-shaped conductor. This U-shape has been selected to reduce the length of the housing. Therefore, the conductor has a first straight section 222 and a second straight section 224 coupled by a traverse section 223. The traverse section 223 may have chamfered edges to minimize reflections. The conductor 220 has a total length including the first straight section 222, traverse section 223, and second straight section 224. All sections having a total length of about ¼ or multiple of ¼ of the wavelength of the wavelength of a signal to be transmitted. The conductor 220 has a short circuit at its short circuit end 228 at one end to the section housing 210. At the opposing end, it has a connector section 221 which may be connected to a coaxial connector 240.

Further, matching components may be provided, like a first matching plate 231 and/or a second matching plate 233. These matching plates are optional and may be adjusted such that the coupler provides a desired impedance like 50 Ohm in a desired frequency range. The coupler may be designed for an operating frequency anywhere in a range between 10 Megahertz and 10 Gigahertz. The length of the conductor has to be matched accordingly. The relative operating bandwidth may be between 2% and 20% of the nominal bandwidth, for which the length of the conductor has been designed.

Figure 2:
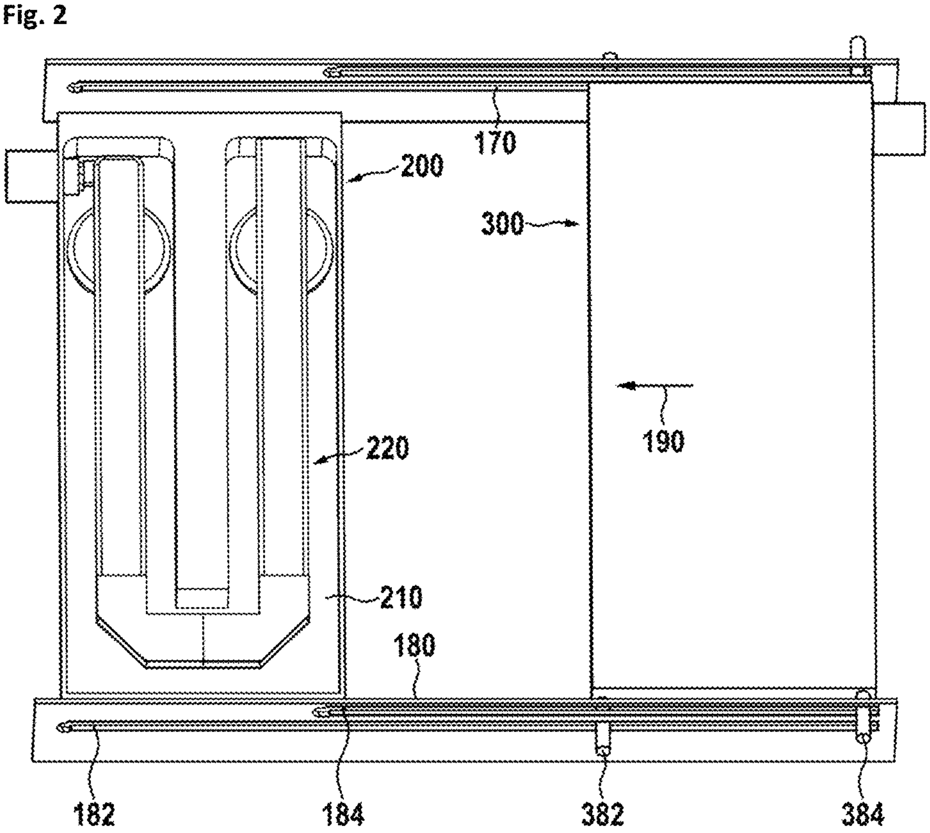
FIG. 2 shows a full RF connector.

FIG. 2 shows a full RF connector 100 including a first coupler section 200 and a second coupler section 300. The internal structure of the first coupler section 200 and the second coupler section 300 is the same. Therefore, they have the same cavity 212, the same conductor 220, and they may also have the same matching plates 231, 233. Both couplers may be mechanically coupled by a housing (not shown) or by a guiding system or by any other suitable coupling means. Here, for example, a first guide rail 170 and a second guide rail 180 are shown. The guide rails may basically be the same. Here, the second guide rail 180 has a first guide slot 182 and a second guide slot 184. The first guide rail 170 may have the same slots. Further, the second coupler section 300 may have a pair of pins including a first guide pin 382 which may be guided by the first guide slot 182, and a second guide pin 384 which may be guided by the second guide slot 184. This pin and slot mechanism allows sliding of the second coupler section 300 in a direction 190 towards and over the first coupler section, such that it may cover the first coupler section completely. In the configuration as shown, the first coupler section 200 and the second coupler section 300 are distant from each other, such that there is no coupling between these coupler sections. After the second coupler section 300 has been moved in direction 190 over the first coupler section 200, such that it fully covers the first coupler section 200, there is a good coupling with very low coupling losses.

As this RF connector 100 is symmetrical, either coaxial connector at the first coupler section 200 or the second coupler section 300 may be used as an input whereas the other may be used as an output.

This configuration basically allows for two different states, an ON-state, where the coupler sections cover each other, and an OFF state, where the coupler sections are distant. This may be used for switching signals and/or RF power. As the coupling is without galvanic contact, switching is also without interrupting a mechanical contact. Therefore, there is no contact and no arcing. Further, the connection has a very low passive intermodulation.

Figure 3:
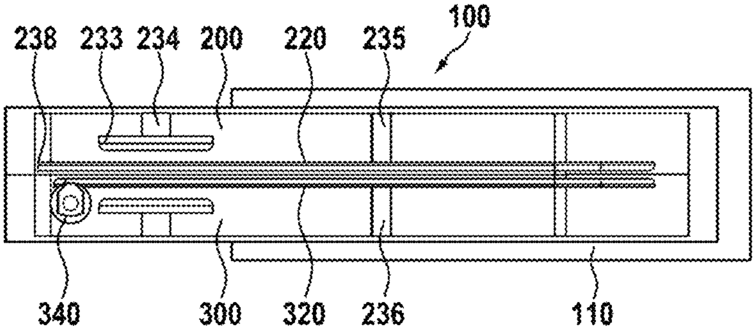
FIG. 3 shows a side view of a first coupler section and a second coupler section in a mated state.

FIG. 3 shows a side view of a first coupler section 200 and a second coupler section 300 in a mated state, where the coupler sections cover each other. Here it is shown that due to the symmetrical arrangement, above the location of the second coaxial connector 340 of the second coupler section 300 is the short circuit at the short circuit end 228 of conductor 220 of the first coupler section 200. Further, it is shown that the conductor 220 of the first coupler section 200 is slightly distant from the conductor 320 of the second coupler section 300. Due to the recessed position of the conductors in the cavity, there remains a gap between the conductors. This results in a contactless coupling between the coupler sections. Here, the coupler sections are held by a housing 110 which may also allow sliding them against each other. The matching plates may have a support like support 234 at matching plate 233. This support may allow height adjustment, such to move the matching plate closer or more distant to the conductor 220. Support 234 may include a dielectric material. It may further include a thread.

Further, at least one tuning rod may be included, like a first tuning rod 235 at the first conductor 220 and a second tuning rod 236 at the second conductor 320. There may be multiple tuning rods. A tuning rod may be configured to bend at least one of the conductors to modify the distance between the conductors.

Figure 4:
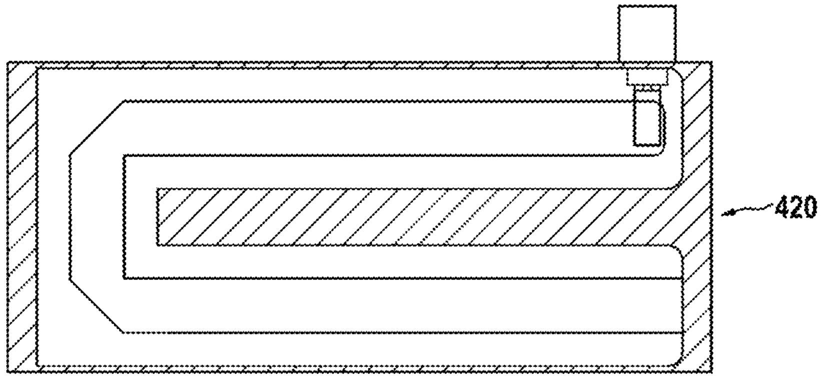
FIG. 4 shows a basic topology of a twofold coupler.

FIG. 4 schematically shows a basic topology of a twofold coupler 420, as described above.

Figure 5:
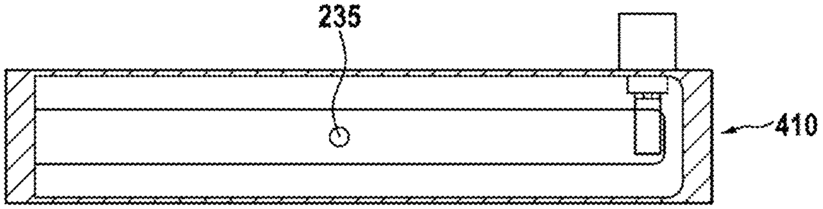
FIG. 5 discloses a single-line coupler.

In FIG. 5, a single-line coupler 410 which is a modification of the twofold coupler 420 shown above but based on the same coupling principle. Such a coupler may be used at shorter wavelengths corresponding to higher frequencies, where it is not necessary to fold the line to reduce the length of the coupler.

Figure 6:
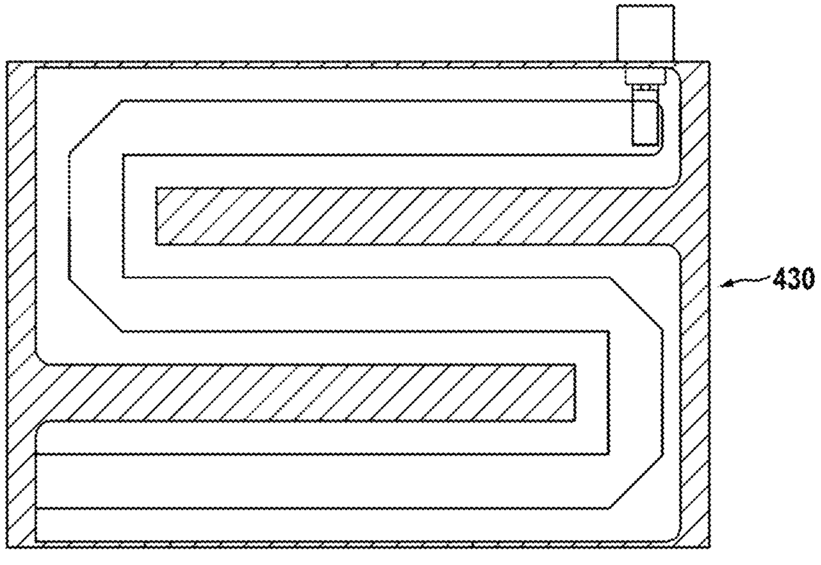
FIG. 6 shows a threefold coupler.

FIG. 6 shows a threefold coupler 430, where the line is folded into three sections. This allows further reduction of space, specifically for lower frequencies.

Figure 7:
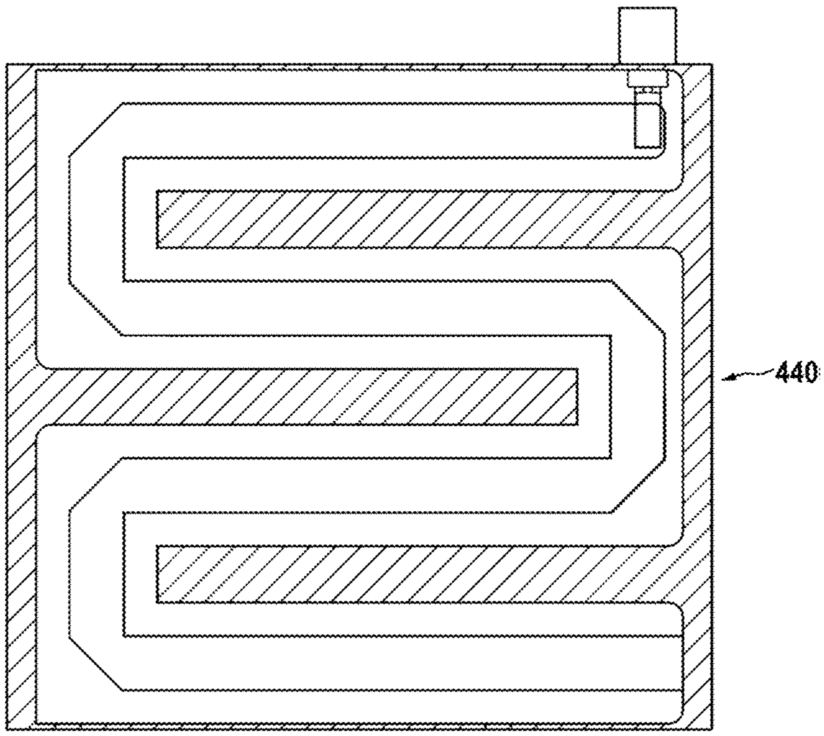
FIG. 7 shows a fourfold coupler.

FIG. 7 shows the basic concept of a fourfold coupler 440 which is similar to the couplers shown before, but with a line folded four times to further reduce size of the coupler.

FIGS. 8 to 14 relate to a second embodiment which is very similar to the first embodiment, such that only differences are explained.

Figure 8:
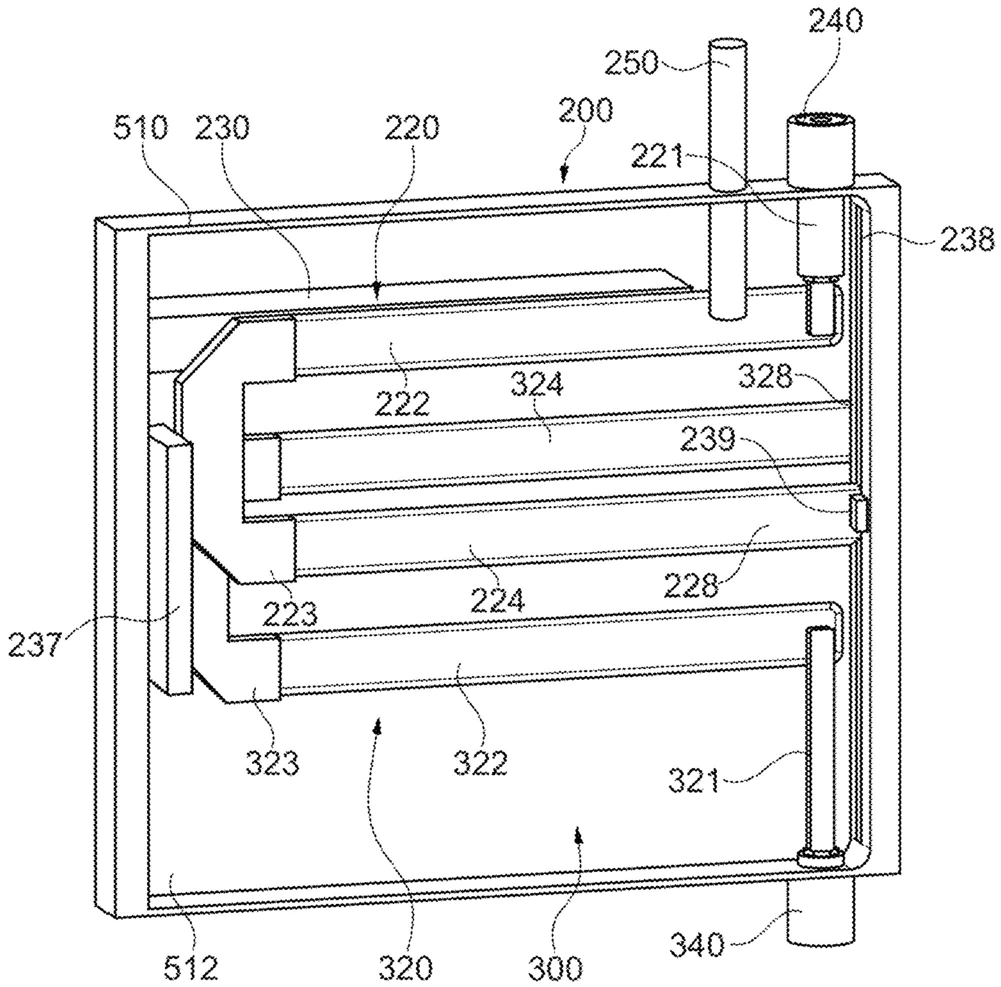
FIG. 8 shows a second embodiment in an OFF state

In FIG. 8, the second embodiment is shown in an OFF state. In this embodiment, a first coupler section 200, a symmetrical second coupler section 300 are held in a common housing 510. For switching between an OFF state and an ON state, at least one of the coupler sections is moved relative to the other coupler section within the common housing. In the OFF state shown in this figure, the first coupler section 200 is displaced e.g., upwards, such that the first conductor 220 of first coupler section 200 is distant from, e.g., not overlapping the second conductor 320 of second coupler section 300. Further, at least one of the conductors may be in proximity of a short circuit element 230, such that there is a capacitive coupling between the common housing 510 and the at least one of the conductors via the short circuit element 230. There may be multiple short circuit elements which may be arranged close to multiple sections, which may be the straight sections of a conductor in the position of an OFF state.

The first conductor 220 includes first straight section 222, traverse section 223, and second straight section 224. All sections having a total length of about ¼ of the wavelength or multiple of ¼ of the wavelength of a signal to be transmitted. The first conductor 220 has a short circuit at its short circuit end 228 to the housing 510. At the opposing end, it has a connector section 221 which may be connected to a coaxial connector 240.

For operating the switch, the first conductor 220 may be relatively movable against the second conductor 320. As long as such a relative movement is provided, it is not relevant which conductor is actually moved and which conductor is at a fixed position. Even both conductors may be moved at the same time.

To make the first conductor 220 movable against the fixed second conductor 320, the connector section 221 may include a telescopic line, which may be variable in length. Such a telescopic line may have a first circular conductor which is slidably within a larger second circular conductor. There may be radial contact springs between the first circular conductor and the second circular conductor. A telescopic line may also include two flat conductors slidably against each other, which may be in galvanic or capacitive contact. Further, a sliding contact 239 may be provided for a short circuit connection to the housing 510 at the short circuit end 228 of the first conductor 220. The sliding contact may include at least one contact spring which may include a contact material like brass or steel or any other suitable material and may have a conductive surface which may include a contact material like silver or gold.

The first conductor 220 may have a support by a guide block 237 which may have a means for slidably guiding the first conductor 220. The guide block 237 may have a groove in which the first conductor 220 may slide. The guide block 237 may further support and stabilize the second conductor 320. The guide block may include dielectric material to prevent a short circuit between the conductors and to the ground. The short circuit end 228 of the first conductor 220 may be slidably guided in a groove 238 at or within the housing 510. For movement of the first conductor 220, an actuator 250 may be provided. This may be a rod of dielectric material. The actuator 250 may allow to move the first conductor 220, e.g., in a linear movement. The actuator 250 may be operated manually or driven by a motor (not shown). When the motor does not move, it may hold the first conductor at its actual position. The actuator may also include a gear or geared rod or any other suitable means for performing a linear movement.

Figure 9:
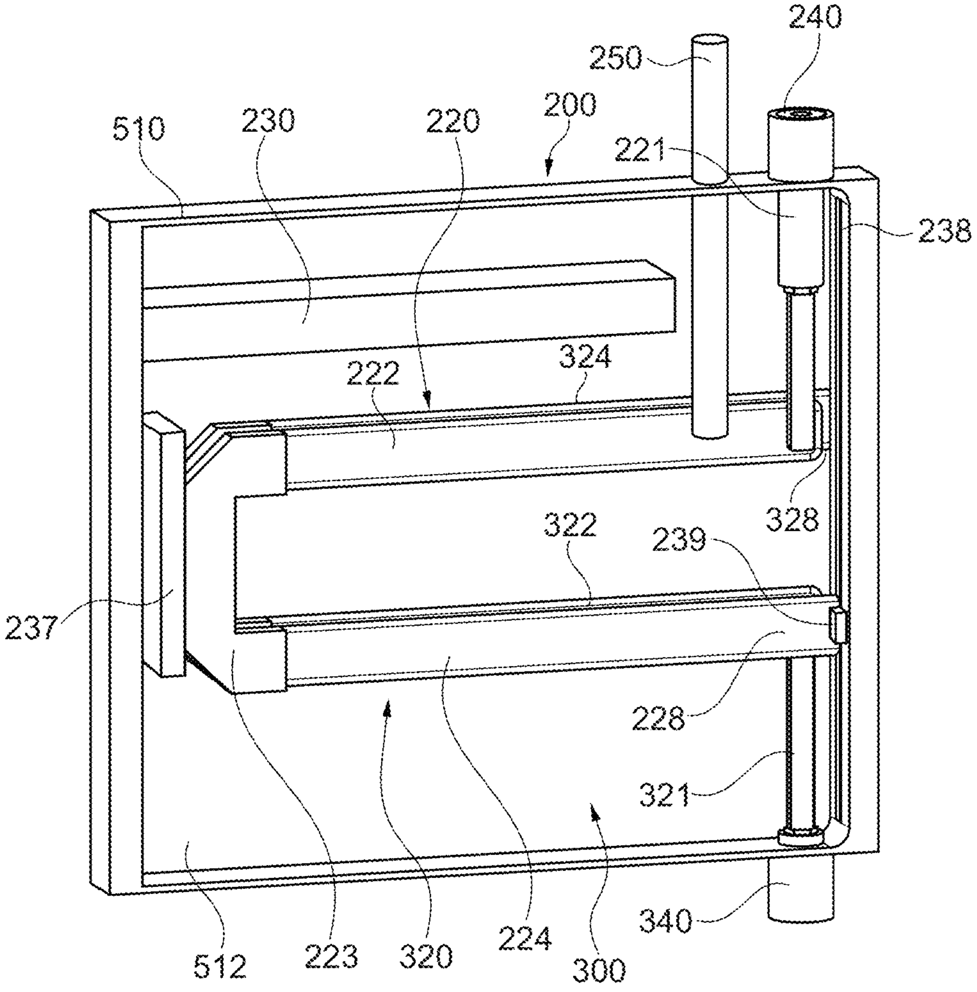
FIG. 9 shows the second embodiment in an ON state

The first conductor 220 may be positioned at any position between the off-position shown in FIG. 8, where the conductors are distant from each other and the on-position as shown in FIG. 9, where conductors are close to each other.

The second conductor 320 includes first straight section 322, traverse section 323, and second straight section 324. All sections having a total length of about ¼ of the wavelength or multiple of ¼ of the wavelength of a signal to be transmitted. The second conductor 320 has a short circuit 328 at one end to the housing 510. At the opposing end, it has a connector section 321 which may be connected to a coaxial connector 340. The connector section 321 may be variable in length.

In FIG. 9, the second embodiment is shown in an ON state. In this state, the first coupler section 200 is in close proximity to the second coupler section 300 such that the conductors 220, 320 are facing each other.

Figure 10:
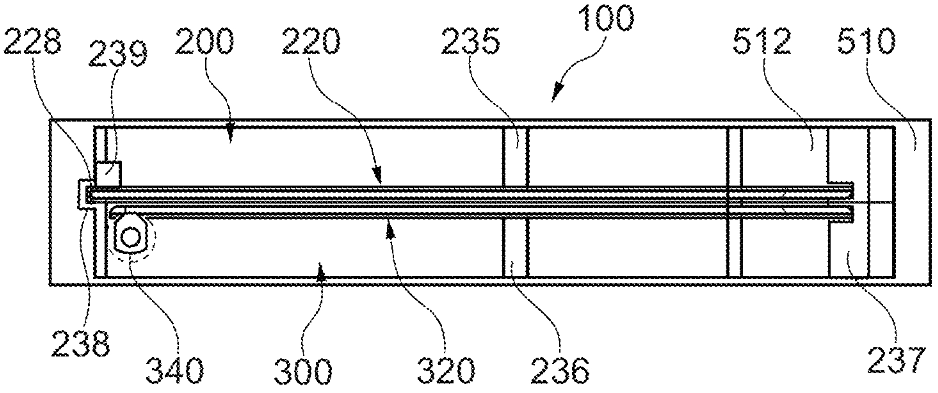
FIG. 10 shows a side view of the second embodiment.

FIG. 10 shows a side view of the second embodiment. It shows the conductors 220, 320 facing each other in an ON state, resulting in a small gap between the conductors.

Figure 11:
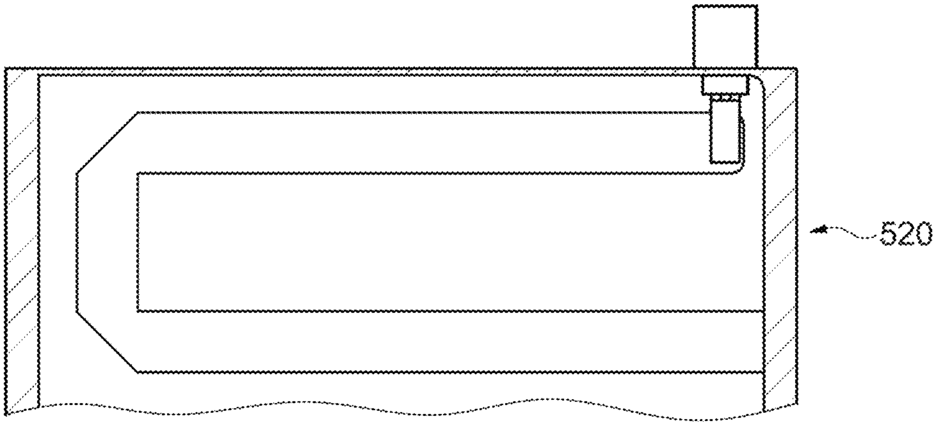
FIG. 11 shows a basic topology of a twofold coupler.

FIG. 11 schematically shows a basic topology of a twofold coupler 520, as described above. Here, for clarity only one conductor is shown. The second conductor is symmetrical thereto. In the following also only one conductor is shown.

Figure 12:
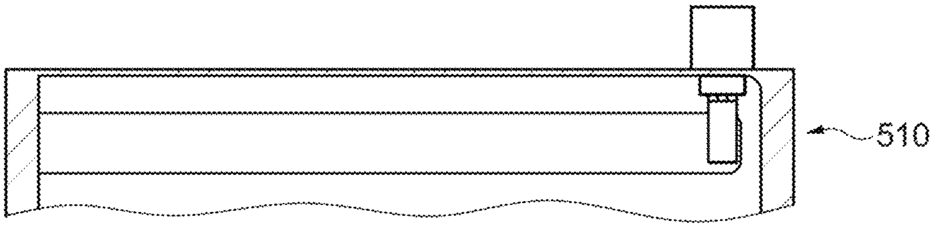
FIG. 12 discloses a single-line coupler.

In FIG. 12, a single-line coupler 510, which is a modification of the twofold coupler 520 shown above but based on the same coupling principle. Such a coupler may be used at shorter wavelengths corresponding to higher frequencies, where it is not necessary to fold the line to reduce the length of the coupler.

Figure 13:
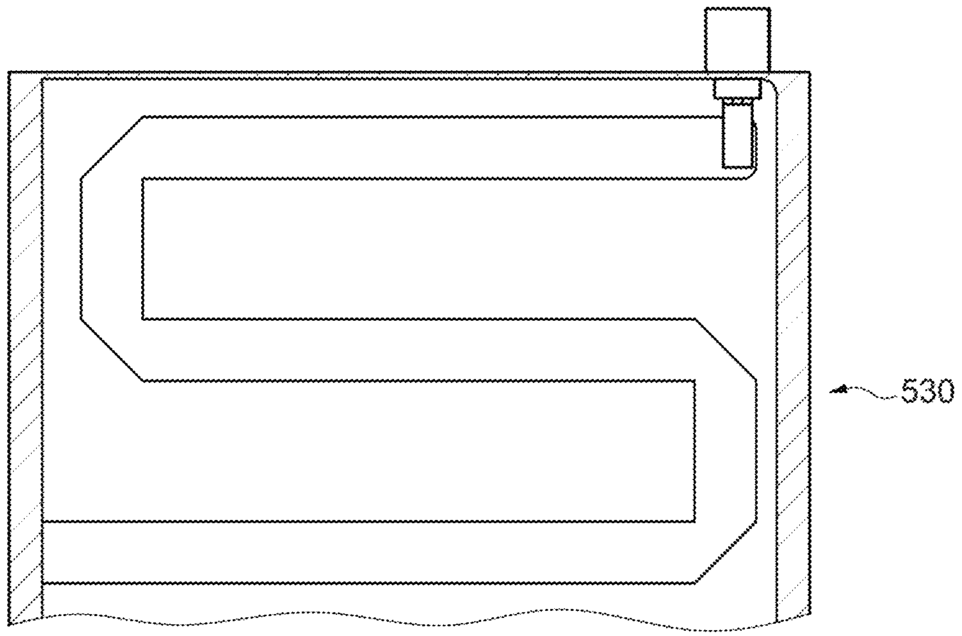
FIG. 13 shows a threefold coupler.

FIG. 13 shows a threefold coupler 530, where the line is folded into three sections. This allows further reduction of space, specifically for lower frequencies.

Figure 14:
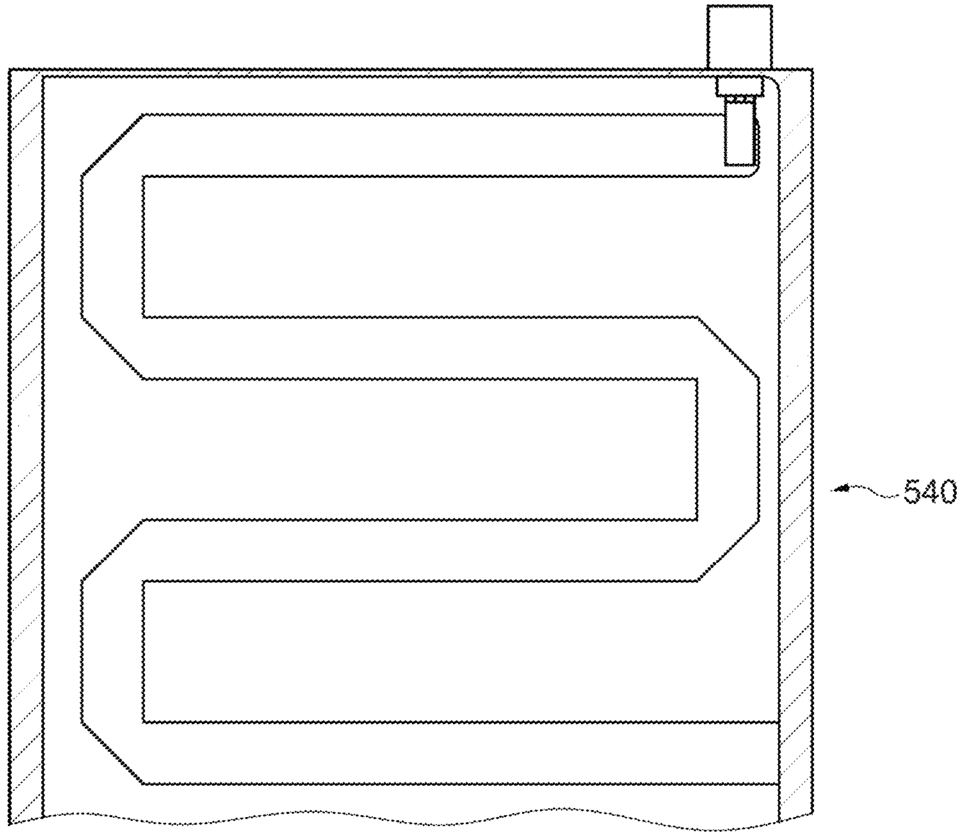
FIG. 14 shows a fourfold coupler.

FIG. 14 shows the basic concept of a fourfold coupler 540, which is similar to the couplers shown before, but with a line folded four times to further reduce size of the coupler.

LIST OF REFERENCE NUMERALS

100 RF connector
110 housing
170 first guiderail
180 second guiderail
182 first guide slot
184 second guide slot
190 direction of movement
200 first coupler section
210 first section housing
212 cavity
220 first conductor
221 connector section
222 first straight section
223 traverse section
224 second straight section
228 short circuit end of conductor
230 short circuit element
231 first matching plate
233 second matching plate
234 matching plate support
235 tuning rod at first conductor
236 tuning rod at second conductor
237 guide block
238 guide groove
239 sliding contact
240 first coaxial connector
250 actuator
300 second coupler section
310 second section housing
320 second conductor
321 connector section
322 first straight section
323 traverse section
324 second straight section
328 short circuit
340 second coaxial connector
382 first guide pin
384 second guide pin
410 single line coupler
420 two fold coupler
430 three fold coupler
440 four fold coupler
510 common housing
512 cavity

The invention claimed is:

1. An RF connector comprising a first coupler section, a second coupler section symmetrical to the first coupler section, and at least one housing, wherein the first coupler section comprises a first conductor, and the second coupler section comprises a second conductor, wherein each of the first conductor and the second conductor:

comprises an elongated structure of a flat conductive material, is recessed against an outer surface of the at least one housing, has a length corresponding to 1/4 or a multiple of 1/4 of a nominal wavelength of a signal to be coupled, is connected at a first end thereof to a coaxial connector, and is connected at a second end thereof to the at least one housing, wherein the RF connector is configured to be switched between an ON state and an OFF state by moving one of the first conductor and the second conductor against the other of the first conductor and the second conductor, wherein in the OFF state the first conductor is distant from the second conductor and in the ON state the first conductor is in close proximity to the second conductor such that the first and second conductors are facing each other, and wherein the RF connector comprises a mechanical support structure configured to guide a relative movement of the first and second conductors between respective on-positions corresponding to the ON state and respective off-positions corresponding to the OFF state and to hold the first and second conductors in said positions.

2. An RF connector according to claim 1, comprising at least one actuator configured to move the first conductor.

3. An RF connector according to claim 1, wherein both the first and second conductors are contained in the at least one housing holding both the first and second conductors.

4. An RF connector according to claim 3, further comprising at least one capacitive short circuit element located at an off-position of at least one of the first and second conductors and configured to provide capacitive coupling between the at least one of the first and second conductors and the at least one housing.

5. An RF connector according to claim 3, further comprising at least one galvanic short circuit element located at an off-position of at least one of the first and second conductors and configured to provide a galvanic short circuit between the at least one of the first and second conductors and the at least one housing.

6. An RF connector according claim 1, wherein the first and second conductors are arranged slidable sidewards and parallel against each other and/or the first and second conductors are arranged slidably perpendicular to straight sections of the first and second conductors.

7. An RF connector according to claim 1, wherein in the ON state: each of the first and second conductors is arranged in a separate corresponding plane, the separate corresponding planes of the first and second conductors are parallel and the first and second conductors are mirror-symmetrical about a symmetry plane between the separate corresponding planes, wherein the symmetry plane is parallel to the separate corresponding planes and/or the first and second conductors are separated by a constant distance.

8. An RF connector according to claim 1, wherein in the ON state:

the first and second conductors are separated by a distance that is smaller than 1/10 of the nominal wavelength of the signal to be coupled.

9. An RF connector according to claim 8, wherein each of the first and second conductors has a curved shape.

10. An RF connector according to claim 1, wherein each of the first and second conductors has an I shape or a U shape.

11. An RF connector according to claim 1, wherein each of the first and second conductors is a flat conductor and has a first straight section and at least one second straight section parallel to the first straight section, wherein each of present straight sections is interconnected to a neighboring straight section of the present straight sections by a traverse section.

12. An RF connector according to claim 1, further comprising a sealing strip and/or gasket at an open side of the at least one housing to improve electrical contact.

13. An RF connector according to claim 1, further comprising a cover dimensioned to cover at least one open side of a coupler section of the first and second coupler sections in the OFF state.

14. An RF connector according to claim 1, further comprising at least one matching plate between the at least one housing and a conductor of the first and second conductors, the at least one matching plate being adjustable to change a distance separating the at least one matching plate from said conductor of the first and second conductors.

15. An RF connector according to claim 14, wherein the at least one matching plate includes a dielectric material or a conductive material that is electrically connected to the at least one housing.

16. An RF connector according to claim 1, further comprising at least one tuning rod configured to bend at least one of the first and second conductors to modify a distance between the first and second conductors.

17. An RF connector according to claim 16, wherein the at least one tuning rod includes a dielectric material.

* * * * *